Jan. 8, 1952     T. R. SMITH     2,582,077
SPRING TYPE CLUTCH
Filed Oct. 27, 1948     2 SHEETS—SHEET 1
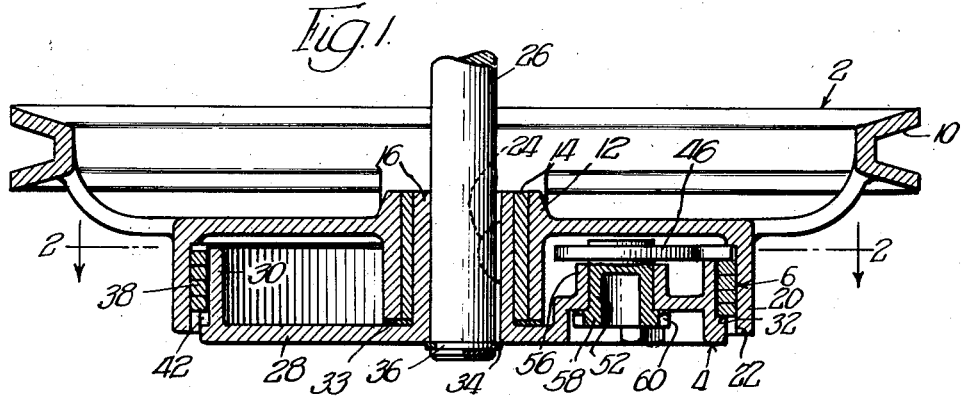
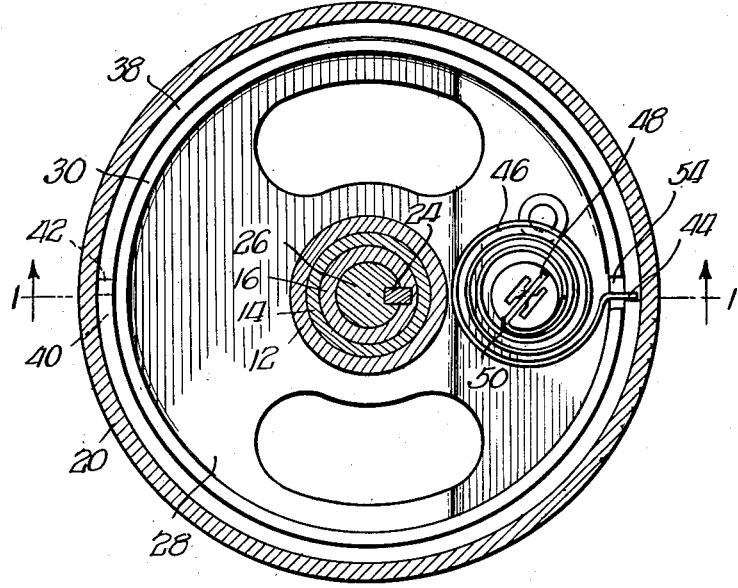
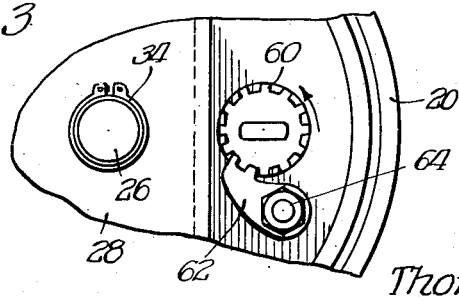
INVENTOR.
Thomas R. Smith,
BY
Wilkinson, Huxley, Byron & Hume
Attys.

Jan. 8, 1952 — T. R. SMITH — 2,582,077
SPRING TYPE CLUTCH
Filed Oct. 27, 1948 — 2 SHEETS—SHEET 2
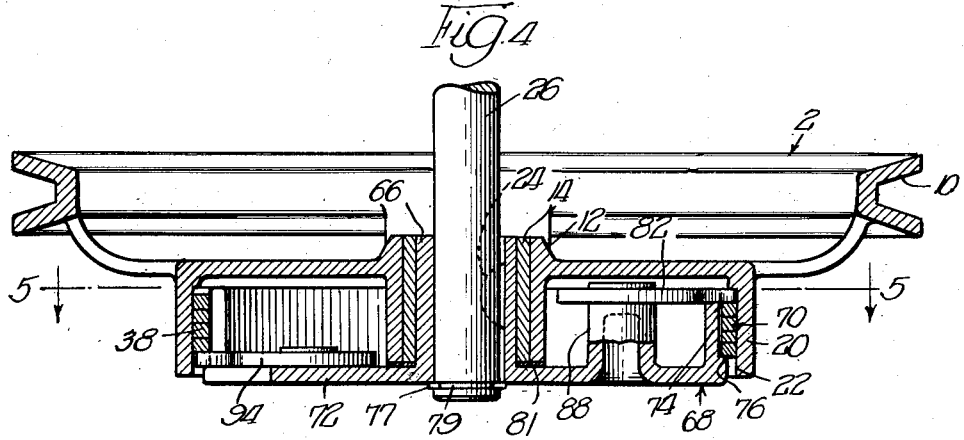
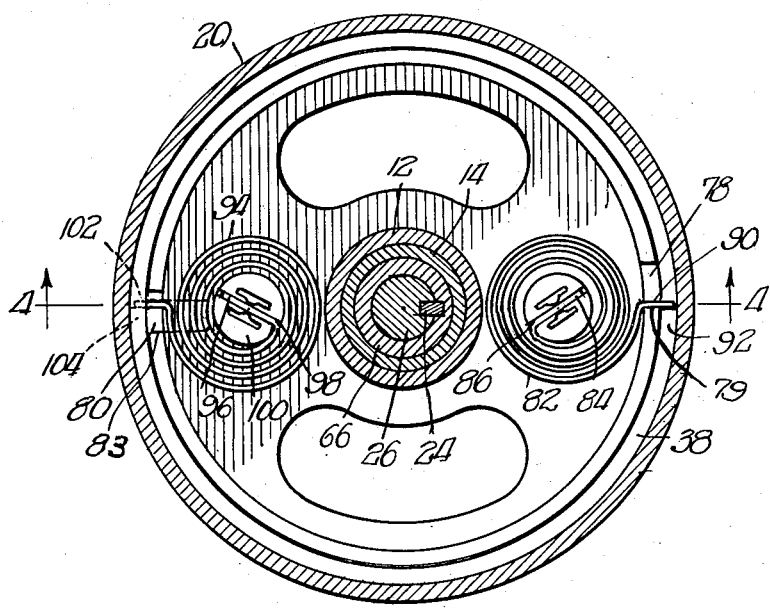
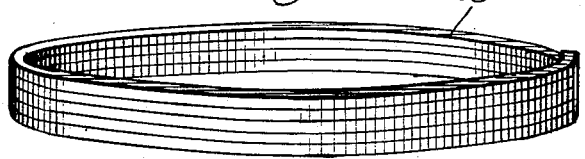
INVENTOR.
Thomas R. Smith, Patented Jan. 8, 1952.

2,582,077

UNITED STATES PATENT OFFICE 2,582,077

SPRING TYPE CLUTCH

Thomas R. Smith, Newton, Iowa, assignor to The Maytag Company, Newton, Iowa, a corporation of Delaware Application October 27, 1948, Serial No. 56,846

12 Claims. (Cl. 192—56)

The present invention relates to friction clutches and more particularly to friction clutches which are essentially independent of normal variations in coefficient of friction and operate to transmit a constant torque in a predetermined amount from a driving member to a driven member but which permit slippage between these members when the torque exceeds such predetermined amount.

Among the objects of the present invention is to provide a constant torque slip clutch of simple construction which in one direction of rotation of a driving member effects a frictional drive between said drive member and a driven member for transmitting torque in a predetermined amount, but which permits slippage between the members when the torque exceeds such predetermined amount and which at the same time provides a non-slip driving connection between said members upon rotation of said driven member in the opposite direction.

In many power transmitting assemblies, the capacity required of an electric motor to cause rotation at normal operating speeds of some instrumentality driven thereby is less than is necessary to bring said instrumentality up to speed from rest within relatively short periods of time. In such instances, the initial load placed upon the motor would be such as to burn out the field windings of the motor unless some provision is made to control the load whereby the motor is not overloaded during the time when the load is initially applied to said motor. From an economical standpoint, it is more desirable to provide a motor of a capacity sufficient to operate the instrumentality at normal operating speeds of rotation and to provide some means to prevent overloading of the motor during the initial starting operation, otherwise a larger motor would be necessary to carry the load placed upon it during the initial starting operation. Such means may take the form of a clutch mechanism adapted to permit slippage between the motor and the instrumentality during the initial starting operation to protect the motor against being overloaded, the said clutch mechanism being so designed as to eliminate the slippage after the instrumentality has been brought up to normal operating speeds, whereby the motor is capable of operating under non-slip conditions to maintain this normal operating speed. Clutches of this type are particularly adapted for use in washing machines in which a basket or receptacle is brought up to speed for spinning the basket to remove liquid from the material contained therein. In such devices, a motor of relatively small capacity may be used to bring the basket from rest up to operating speed within a reasonable length of time by providing a friction clutch of the type herein contemplated between the motor and basket to prevent overloading of the motor during that period of time, after which the motor operates to spin the basket at normal operating speed without slippage in the clutch mechanism.

It is, therefore, an object of the invention to provide novel clutch mechanisms adapted to be used under the circumstances immediately above enumerated, whereby some instrumentality, such as a basket or container for a washing machine, together with its load, may be brought up to normal operating speeds within a reasonable length of time without overloading the driving motor, but which provides for transmittal of torque without slippage once the normal operating speed has been attained.

Other objects, features, capabilities and advantages are comprehended by the invention, as will later appear and as are inherently possessed thereby.

Referring to the drawings:

Figure 1 is a vertical cross-sectional view of a constant torque slip clutch made in accordance with the present invention, the same being taken in a plane represented by line 1—1 of Figure 2 of the drawings;

Figure 2 is a horizontal cross-sectional view of the clutch shown in Figure 1 of the drawings and taken in the plane represented by line 2—2 of that figure;

Figure 3 is a fragmentary bottom plan view of the clutch shown in Figure 1 of the drawings disclosing certain adjusting mechanism more in detail;

Figure 4 is a vertical cross-sectional view similar to that of Figure 1 of the drawings disclosing a modified form of clutch mechanism, and taken more particularly in the plane represented by line 4—4 of Figure 5 of the drawings;

Figure 5 is a horizontal cross-sectional view taken in the plane represented by line 5—5 of Figure 4 of the drawings; and Figure 6 is a view in perspective of a coil spring used in both of the modifications for frictionally transmitting torque from the driving member to the driven member.

Referring now more in detail to the drawings, an embodiment selected to illustrate the invention is disclosed in Figures 1 to 3 as comprising a driving member in the form of a pulley 2, a driven member 4 and clutch mechanism 6 for transmitting torque between said members. More particularly, the assembly as herein disclosed is especially adapted for use in washing machines in which a drive is effected between a source of power, such as an electric motor or the like, and a basket or container whereby the said basket or container may be rapidly rotated for extracting liquid from the clothes or other materials contained therein.

The pulley 2 is provided with a V-shaped peripheral groove 10 adapted to receive a belt driven by any suitable source of power, such as an electric motor or the like. This pulley 2 is formed with a central hub 12 having a bushing or bearing 14 mounted therein which is mounted for rotation about a hub 16 of the driven member 4. The pulley 2 is formed with a depending cylindrical wall 20 providing an inside cylindrical face 22 through which a friction drive is effected between the pulley 2 and the driven member 4. The driven member 4 has its central hub 16 keyed, as at 24, to a shaft 26 driven thereby for operating any desired instrumentality. The driven member 4 is further characterized by having a disc-shaped body portion 28 extending radially from the hub 16 which has a cylindrical wall 30 extending upwardly therefrom in spaced relation inwardly of the periphery thereof to provide a shoulder 32, the said wall being also spaced from the wall 20 of the driving member 2. Mounted upon the driven member 4 in embracing relation to the central hub 16 thereof is a washer 33 adapted to form a bearing whereby the pulley 2 and bushing 14 are rotatably supported by the driven member 4. The driving and driven members are maintained in operative position with respect to the shaft 26 by means of the spring retainer ring 34 which is snapped into an annular groove 36 formed adjacent the end of the shaft 26 and disposed in abutting relation to the driven member 4.

Disposed within the annular space provided between the walls 20 and 30 of the driving and driven members, respectively, is a helically wound spring 38, each turn of which is rectangular in cross-section to provide inner and outer surfaces formed of uniform diameter. This spring embraces the wall 30 of the driven member and is supported upon the annular shoulder 32 and has one end thereof, namely its pick-up end 40, disposed in abutting relation to a lug 42 formed as a part of the driven member which extends above the shoulder 32 thereof. The other or driving end of the spring 38 is yieldably engaged by the outer end 44 of a spiral spring 46 which has its other or inner end 48 secured within the slot 50 of a support 52 which is mounted upon the driven member 4 and disposed inwardly and radially of the wall 30. The outer end 44 of the spiral spring 46 extends outwardly through an opening 54 provided in the wall 30 into engagement with the driving end of the spring 38.

As will be clearly apparent, the spring 46 urges the spring 38 into frictional engagement with the surface 22 of the driving member 2 whereby a frictional drive is effected between the driving and driven members 2 and 4, respectively. As the driving member 2 is rotated in a counterclockwise direction, as viewed in Figure 2 of the drawings, the clutch spring 38 is effective to transmit torque between the driving and driven members through the spiral spring 46 in an amount dependent upon the force applied to the actuating end of the spring 38 by spiral spring 46. In the event torque exceeds that amount, the spring 46 is actuated to permit the end 40 of the spring 38 to move away from the abutment 42 and thereby permit contraction of the spring 38 toward the inner wall 30 so that it is impossible to transmit any more torque along the driving surfaces of the driving member and spring 38 than it takes to actuate the spring 46. There is thus provided a friction clutch mechanism in which constant torque in a predetermined amount can be transmitted in one direction only between the driving and driven members which, if exceeded, permits slippage between the said members so that it is impossible with such an ararngement to overload the drive motor, or the like. If the driving member 2 is rotated in a clockwise direction, as viewed in Figure 2 of the drawings, a direct drive is effected between the same and the driven member 4.

In order to adapt the friction clutch mechanism for the transmittal of torque in varying amounts, the spring mounting is made adjustable. As will be noted, the support 52 is rotatably mounted within the hub 56 extending upwardly from the body portion 28 of the driven member 4. The support 52 is provided with a lower flanged end 58 adapted to abut the hub 56 which is formed with peripheral under-cut grooves 60 adapted to be selectively engaged by one or more projections extending laterally at the end of a latch member 62 which is secured by means of a bolt 64 to the body portion 28 of the driven member 4. It will be clear from the drawings that the bolt 64 provides means for locking the latch 62 with respect to the support 52 and the latch 62 serves to maintain the support 52 in its operative association with the hub 56. The spiral spring 46 may be readily adjusted for exerting a variable force to the end of the coil spring 38 by rotating the support 52 and locking said support in any of its adjusted positions by means of the latch 62 and bolt 64.

Figures 4 and 5 of the drawings illustrate a modification of the present invention, the same including a driving member in the form of a pulley 2, conforming to that disclosed in Figure 1 of the drawings, the same having a V-shaped peripheral groove 10 for receiving a belt which may be driven from a source of power, such as a motor or the like. This pulley 2, as in the previous illustration, is formed with the central hub 12 having a bushing or bearing 14 fixed therein which is mounted for rotation about the hub 66 of a driven member 68. The pulley 2 is also formed with a depending cylindrical wall 20 having the inner cylindrical friction surface 22, all in accordance with the embodiment shown in Figures 1 and 2 of the drawings.

In this illustrative embodiment of the invention, the driven member 68 and the clutch mechanism 70 varies somewhat from the corresponding elements of the previously disclosed embodiment, the differences in construction being for the purpose of providing for the transmittal of constant torque in a predetermined amount between the driving and driven members 2 and 68, respectively, in both directions of rotation of the drive member 2 and to permit slippage therebetween when the torque exceeds said amount.

The driven member 68 is keyed to the shaft 26 by key 24 for driving any desired instrumentality and is provided with a disc-shaped body portion 72 extending outwardly from the hub 66 which has an upstanding, substantially cylindrical wall 74 off-set inwardly and radially from the periphery of the body portion 72 to provide the annular shoulder 76. The cylindrical wall 74 at one point is interrupted to form a shallow opening 78 and at another and opposite point to form a relatively deep opening 80. The driving and driven members are secured in operative relation to the shaft 26 by means of a spring retainer ring 77 adapted to be snapped into an annular groove 79 formed adjacent the end of shaft 26 and disposed in abutting relation to the driven member 68. Mounted upon the driven member 68 in embracing relation to the central hub 66 thereof is a washer 81 adapted to form a bearing whereby the pulley 2 and bushing 14 are rotatably supported by the driven member 68.

The torque transmitting clutch mechanism embodies a helically wound spring 38, corresponding to the spring of the embodiment shown in Figures 1 and 2 of the drawings, which embraces the wall 74 of the driven member 68 and is supported by the annular shoulder 76 formed thereon. This clutch mechanism further embodies a spiral spring 82 having its inner end 84 mounted within the slot 86 formed in the upper surface of a pedestal or boss 88 extending upwardly from the body portion 72 of the driven member. The other end 90 of the spring 82 extends outwardly through the opening 78 into yieldable engagement with the upper end 92 of the coil spring 38. The clutch mechanism further embodies a spiral spring 94 conforming substantially to the spiral spring 82 which has its inner end 96 disposed within a slot 98 formed in the boss or pedestal 100 which extends upwardly from the body portion 72. The other end 102 of the spiral spring 94 extends outwardly through the opening 80 in the wall 74 and engages the lower end 104 of the spring 38.

It will be apparent that spiral springs 82 and 94 exert a force against the ends of the spring 38 to expand the same into frictional engagement with the surface 22 of the driving member 2. These opposite forces are constant so that a constant torque of predetermined value may be transmitted between the driving and driven members in either direction of rotation of the driving member and will permit slippage between these members when the torque exceeds such predetermined amount. Thus, assuming the driving member 2 is rotated in a clockwise direction and that the loading on the driven member 68 exceeds the predetermined loading of the spiral spring 94, the coil spring 38 and the wall 20 of the driving member moves relative to the driven member and the coil spring 38 will, with the end 104 thereof pushing against the end 102 of the spiral spring 94, transmit torque therethrough to likewise rotate the driven member 68 in a clockwise direction. The end 90 of the spiral spring 82 maintains the end 92 of the coil spring 38 in contact with the drum surface 22 until the end 90 engages the wall or abutment 79 of the opening 78 to thereby stop its movement in that direction. Upon continued relative movement between the coil spring 38 and the driven member 68, the spiral spring 94 contracts further and the end 92 of the spring 38 moves out of contact with the end 90 of spring 82 and the spring 38 contracts toward the driven drum to permit slippage between it and the wall 20 to limit the torque.

When the rotation of the driving member 2 is in a counterclockwise direction and under excessive load conditions, the opposite action takes place in that the end 92 of coil spring 38 transmits the torque to the driven member 68 through the end 90 of the spiral spring 82 and moves it away from the abutment 79. As the coil spring 38 continues to move relative to the driven member 68, the end 102 of the spiral spring 94 follows the end 104 of the coil spring to maintain it in engagement with the driving drum surface 22. This continues until the end 102 of spring 94 engages the wall or abutment 83 of the opening 80 whereby, when the spiral spring is moved further by reason of an overload, the end 104 of the coil spring 38 moves away from the end 102 and contracts toward the driven drum for the reasons given above. It is contemplated that in the event it is desired to vary the tension of the springs 82 and 94 of this embodiment, this may be done by incorporating the adjusting means of the first described embodiment therein. It should be noted that the ends 90 and 102 of the spiral springs 82 and 94, respectively, provide resilient connections or yieldable abutments for the ends of the spring 38 in contra-distinction to the fixed abutment 42 of the embodiment shown in Figure 1.

In both embodiments, the friction drive between the driving and driven members builds up exponentially according to the formula:

$$\text{Torque} = k e^{f\phi}$$

where $k$ is a constant, $f$ is the coefficient of friction and $\phi$ is the angular wrap of the spring 38 around the wall 74 expressed in radians. Accordingly, a friction drive is effected which will cause slippage between the driving and driven members at a constant maximum torque. This drive between these members is also always effective below this maximum torque value regardless of any reasonable variation in the coefficient of friction.

While I have herein described and upon the drawings shown illustrative embodiments of the invention, it is to be understood that the invention is not limited thereto, but may comprehend other constructions, arrangements of parts, details and features without departing from the spirit of the invention.

It is claimed:

1. A friction clutch comprising a driving member and a driven member, and means providing for the transmittal of a constant torque in a predetermined amount from said driving to said driven member and permitting slippage between said members when the torque exceeds said amount, said means including a coil spring clutch element carried by one of said members and frictionally engaging the other of said members, means providing a connection between said one of said members and one end of said clutch element, a spiral spring connected at one end to said one of said members and having its other end operatively connected at the other end of said clutch element for applying a force to move said clutch element into frictional engagement with the other of said members, and means for adjusting the connection between said spiral spring and said one of said members for varying the force applied by said spiral spring to said clutch element.

2. A friction clutch comprising a driving member and a driven member, and means providing for the transmittal of a constant torque in a predetermined amount from said driving to said driven member and permitting slippage between said members when the torque exceeds said amount when said driven member is rotated in one direction and to provide a positive driving connection between said members when said driven member is rotated in the opposite direction, said means including a coil spring clutch element carried by one of said members and frictionally engaging the other of said members, an abutment on said one of said members engageable with one end of said clutch element, a spiral spring having one end thereof connected to said one of said members and having its other end in engagement with the other end of said clutch element for applying a force to move said clutch element into frictional engagement with the other of said members, and means for adjusting the connection between said spiral spring and said one of said members for varying the force applied by said spiral spring to said clutch element.

3. A friction clutch comprising a driving member and a driven member having concentrically disposed cylindrical walls radially spaced with respect to one another, and means providing for the transmittal of constant torque in a predetermined amount from said driving to said driven member and permitting slippage between said members when the torque exceeds said amount, said means including a coil spring clutch element carried by said driven member and disposed within the space between said walls, abutment means carried by said driven member engageable with one end of said clutch element, and yieldable means mounted on said driven member inwardly of the cylindrical wall thereof and extending through an opening therein into engagement with the other end of said clutch element for applying a force to expand the same into frictional engagement with said driving member.

4. A friction clutch comprising a driving member and a driven member having concentrically disposed cylindrical walls radially spaced with respect to one another, and means providing for the transmittal of constant torque in a predetermined amount from said driving to said driven member and permitting slippage between said members when the torque exceeds said amount, said means including a coil spring clutch element carried by said driven member and disposed within the space between said walls, abutment means carried by said driven member engageable with one end of said clutch element, and a spiral spring having one end connected to said driven member inwardly of the cylindrical wall thereof and having its other end extending through an opening therein into engagement with the other end of said clutch element for applying a force to expand the same into frictional engagement with said driving member.

5. A friction clutch comprising a driving member and a driven member having concentrically disposed cylindrical walls radially spaced with respect to one another, and means providing for the transmittal of constant torque in a predetermined amount from said driving to said driven member and permitting slippage between said members when the torque exceeds said amount, said means including a coil spring clutch element carried by said driven member and disposed within the space between said walls, abutment means carried by said driven member engageable with one end of said clutch element, a rotatably adjustable support mounted in said driven member, and a spiral spring having one end connected to said adjustable support and its other end extending through an opening in the wall of said driven member into engagement with the other end of said clutch element for applying a force to expand the same into frictional engagement with said driving member.

6. A friction clutch comprising a driving member and a driven member, and means providing for the transmittal of a constant torque in a predetermined amount from said driving to said driven member in either direction of rotation of said driving member and permitting slippage between said members when the torque exceeds said amount, said means including a coil spring clutch element carried by one of said members and frictionally engaging the other of said members, and spiral springs each having one end connected to said one of said members and the other end in engaging relation to an end of said clutch element for applying a force at each end of said clutch element to move the same into frictional engagement with the other of said members.

7. A friction clutch as defined in claim 6 in which means is provided for adjusting the connection between said spiral springs and said one of said members for varying the force applied by said spiral springs to said clutch element.

8. A friction clutch comprising a driving member and a driven member having concentrically disposed cylindrical walls radially spaced with respect to one another, and means providing for the transmittal of a constant torque in a predetermined amount from said driving to said driven member in either direction of rotation of said driving member and permitting slippage between said members when the torque exceeds said amount, said means including a coil spring clutch element carried by said driven member and disposed within the space between said walls, yieldable means mounted on said driven member and extending through openings in the wall thereof into engagement with the ends of said clutch element for applying a force at each end of said clutch element to expand the same into frictional engagement with said driving member.

9. A friction clutch comprising a driving member and a driven member having concentrically disposed cylindrical walls radially spaced with respect to one another, and means providing for the transmittal of a constant torque in a predetermined amount from said driving to said driven member in either direction of rotation of said driving member and permitting slippage between said members when the torque exceeds said amount, and means including a coil spring clutch element carried by said driven member and disposed within the space between said walls, spiral springs each having an end connected to said driven member and an end extending through an opening in the wall of said driven member into engagement with an end of said clutch element for applying a force to expand the same into frictional engagement with said driving member.

10. A friction clutch comprising a driving member and a driven member having concentrically disposed cylindrical walls radially spaced with respect to one another, and means providing for the transmittal of a constant torque in a predetermined amount from said driving to said driven member in either direction of rotation of said driving member and permitting slippage between said members when the torque exceeds said amount, said means including a coil spring clutch element carried by said driven member and disposed within the space between said walls, rotatable adjustable supports mounted in said driven member, and spiral springs each having an end connected to an adjustable support, and an end extending through an opening in the wall of said driven member into engagement with an end of said clutch element for applying a force to expand the same into frictional engagement with said driving member.

11. A friction clutch comprising a driving member and a driven member, and means providing for the transmittal of a constant torque in a predetermined amount from said driving to said driven member in either direction of rotation of said driving member and permitting slippage between said members when the torque exceeds said amount, said means including a coil spring clutch element carried by one of said members and frictionally engaging the other of said members, springs each having one end connected to one of said members and the other end in engaging relation to an end of said clutch element for applying a force at each end of said clutch element to move the same into frictional engagement with the other of said members, and abutments for limiting the angular movement of said last mentioned springs during overload conditions to permit said coil spring clutch element to release.

12. A friction clutch comprising a driving member and a driven member having concentrically disposed cylindrical walls radially spaced with respect to one another, and means providing for the transmittal of a constant torque in a predetermined amount from said driving to said driven member in either direction of rotation of said driving member and permitting slippage between said members when the torque exceeds said amount, said means including a coil spring element carried by said driven member and disposed within the space between said walls, and yieldable means mounted on said driven member and extending through openings in the wall thereof into engagement with the ends of said clutch element for applying a force at each end of said clutch element to expand the same into frictional engagement with said driving member, said wall providing abutments to limit the relative angular movement of said yieldable means to permit said coil spring and yieldable means to disengage to thereby limit the torque transmitted through said spring clutch.

THOMAS R. SMITH.

REFERENCES CITED

The following references are of record in the file of this patent:

UNITED STATES PATENTS

| Number | Name | Date |
|---|---|---|
| 1,561,537 | Hayes | Nov. 17, 1925 |
| 2,360,187 | Almen | Oct. 10, 1944 |
| 2,459,972 | Starkey | Jan. 25, 1949 |